Patented Apr. 21, 1936

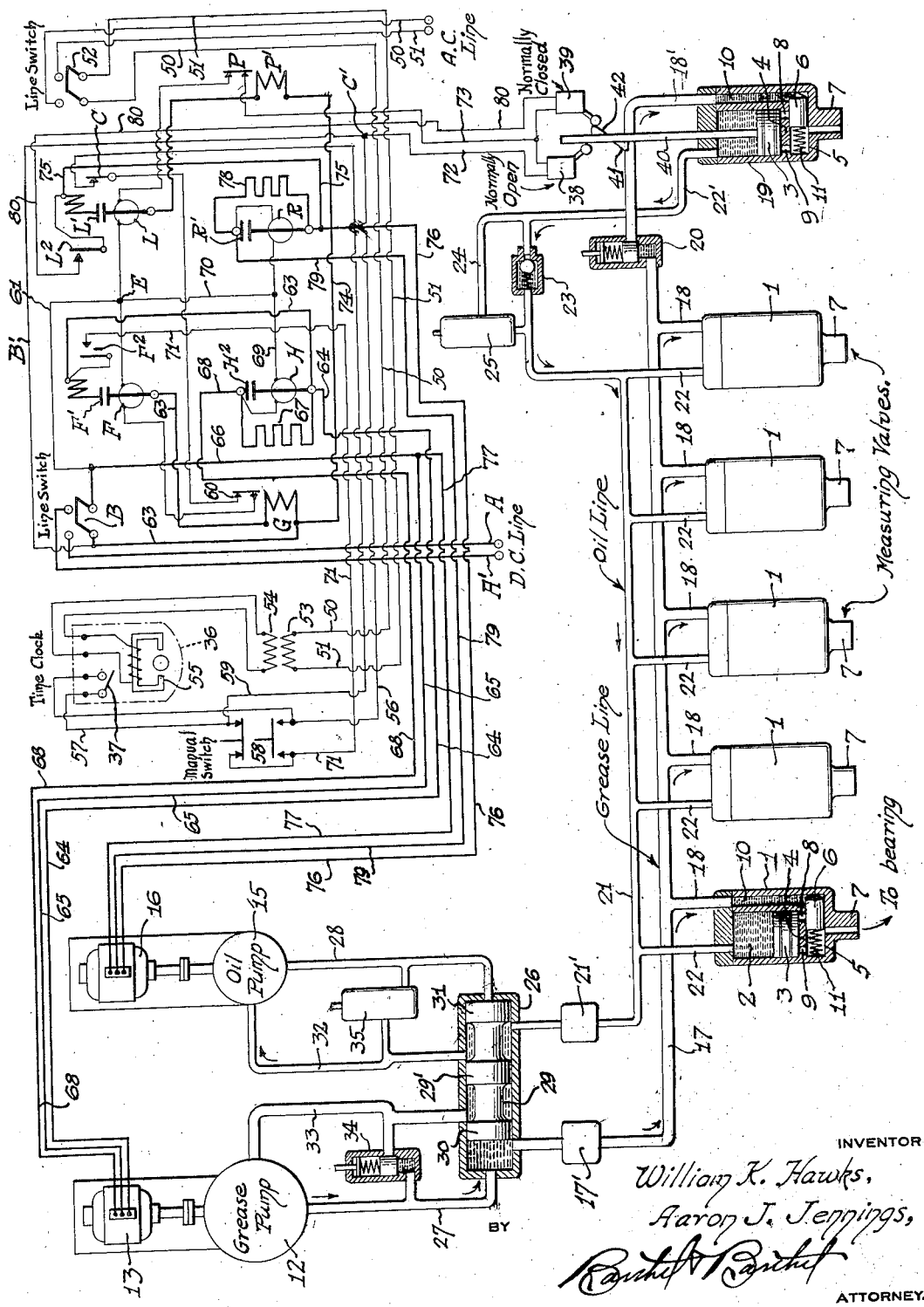

2,038,287

UNITED STATES PATENT OFFICE 2,038,287

AUTOMATIC LUBRICATION SYSTEM

William K. Hawks and Aaron J. Jennings, Battle Creek, Mich., assignors, by mesne assignments, to The Farval Corporation, Cleveland, Ohio, a corporation of Ohio Application January 5, 1931, Serial No. 506,602

22 Claims. (Cl. 184—7)

The present invention pertains to a novel automatic lubrication system, and the principal object is to provide a system wherein a series of measuring valves applied to a number of bearings may be automatically operated at predetermined intervals.

The measuring valves used in the present system are preferably of the type which receive the lubricant under pressure and from which the lubricant is discharged into the bearings under pressure by means of the same or another fluid. The invention therefore embodies a pump for supplying the lubricant or grease and another pump for supplying the other fluid or oil.

The pumps are electrically driven, and the action of the system is initiated by a time switch which sets the grease pump in motion. When the valves have been filled with grease, a mechanism associated with one of the valves stops the grease pump and starts the other pump whereby the grease content of the measuring valves is discharged into the bearings.

The last mentioned valve is known as the control valve and is preferably the last in the series or that disposed at the discharge ends of the fluid lines. Pressure relief valves are inserted in the lines directly in advance of the control valve and are adjusted to open the lines only at the maximum pressures intended for the fluids. Consequently the valves preceding the control valve must receive the fluids at the maximum pressures intended therefor before the relief valves will open. Thus, the control valve will not be supplied with fluid and will not function to control the electrical system until the preceding valves have received fluid at the intended pressures. The failure of the electrical system to operate for this reason may readily be discovered or indicated by any suitable means for the purpose.

The invention is fully disclosed by way of example in the following description and in the accompanying drawing in which the single figure is a diagrammatic view of an apparatus constructed according to the invention, illustrating certain parts in section and showing the electrical wiring diagrammatically.

A series of measuring valves are attached separately to the several bearings to be lubricated. Each such valve comprises a body 1 in which is formed a piston chamber 2 having a piston 3 movably mounted therein. The bottom of the chamber is defined by a partition 4 beneath which is formed a valve chamber 5 fitted with a sliding piston valve 6. An outlet nipple 7 extends from the chamber 5 and is adapted for connection to the bearing in any suitable manner.

The partition has an intake port 8 and an outlet port 9 connecting the piston chamber to the valve chamber. Further, a lubricant intake passage 10 communicates with the valve chamber 5 and is governed by the valve 6 with respect to its communication with the chamber 2 through the port 8. The valve 6 is so dimensioned as to obstruct the intake port 8 in one position, while permitting communication between the discharge port 9 and the outlet nipple 7 through the chamber 5; and in another position to obstruct the passage in nipple 7 while opening the port 8 to the passage 10 so that the chamber 2 may receive lubricant beneath the piston 3. A spring 11 behind the valve 6 normally holds the valve in the former position. The measuring valve is operated by first filling the chamber 2 beneath the piston with lubricant through the passages 10 and 8 and then applying a fluid pressure upon the piston whereby the valve 6 is shifted to discharging position and the lubricant beneath the piston 3 expelled through the port 9, chamber 5 and outlet 7.

The lubricant will hereinafter be identified as grease, and the fluid pressure medium for expelling the lubricant will be referred to as oil, merely for the purpose of illustration and convenience in description.

The grease supply is contained in a suitable reservoir (not shown) from which it is discharged by means of a pump 12. The pump in turn is driven at intervals by an electric motor 13 as will presently be described. In like manner, the oil is contained in a reservoir (not shown) and is discharged by means of a pump 15 driven by an electric motor 16.

A main grease line 17 is connected by branches 18 to the passages 10 of the several measuring valves. The end of the line constitutes a branch 18' leading to the final valve 19 of the series. Between the final valve 19 and the preceding valve, a relief valve 20 is inserted for a purpose which will presently appear.

In a similar fashion, a main oil line 21 is connected by branches 22 to the piston chambers 2 of the several measuring valves. The end 22' of this line is also formed as a branch leading to the chamber 2 of the final valve 19. Between the end 22' and the preceding branch 22, a check valve 23 is inserted in the line. This valve obstructs flow in the direction towards the final valve. Oil is supplied to the final valve through a by-pass 24 around the check valve 23, and in the by-pass is inserted a pressure relief valve 25, similar to the valve 20, also for a purpose which will presently be described.

The flow to the lines 17 and 21 is controlled by a shuttle valve or two-way line valve including a chamber or cylinder 26 at the intake ends of the respective lines. A line 27 extends from the grease pump 12 to one end of the cylinder 26, and a similar line 28 extends from the oil pump 15 to the other end of the cylinder. In the cylinder 26 is slidably mounted a shuttle valve member comprising a rod 29 of considerably smaller diameter than the inner wall of the cylinder and formed at its ends with heads 30 and 31 which have a sliding fit in the cylinder. When the grease pump is in operation, the pressure created thereby displaces the shuttle valve member to a position where the head 30 lies between the lines 17 and 21, thereby permitting free communication between the lines 27 and 17, and where the head 31 lies between the lines 21 and 28 and obstructs communication therebetween. Strainers 17′ and 21′ are preferably inserted in the lines 17 and 21 respectively between the cylinder 26 and the first valve 1.

When the valve chambers 2 are thus being filled with grease beneath the pistons 3 thereof, the oil disposed above the pistons is displaced by the upward movement of the latter. In order that this displacement may occur without obstruction, a return line 32 extends from the cylinder 26 to the oil reservoir. This line is so positioned as to be in communication with the line 21 when the grease pump is operating, whereby the oil displaced from the chambers 2 is returned through the branches 22, line 21, cylinder 26 and line 32 to the oil reservoir. The oil returning from the final valve 19 avoids the pressure relief valve 25 by opening the ball check valve 23.

In a somewhat similar manner, a return line 33 extends from the cylinder 26 to the grease reservoir and is in communication with the grease line 17 when the oil pump is operated, but is not entirely identical with the line 32 in function, inasmuch as grease is not ordinarily returned to the line when oil is supplied under pressure. The opening of line 17 to line 33 is to eliminate the possibility of trapped pressure in the grease line while the valves are being discharged by the oil pump.

The rod 29 carries an intermediate head 29′ positioned to separate the lines 17 and 33 from the lines 21 and 32 respectively, thereby avoiding the mixing of oil and grease in the space between the heads 30 and 31.

A pressure relief valve 34 is connected across the lines 27 and 33 and is set at a pressure equal to or slightly greater than that with which the grease is intended to be delivered to the line 17, so that if the pump should develop an excessive pressure, the excess will be relieved through the line 33 to the grease reservoir. In like manner, a pressure relief valve 35 is connected across the oil lines 28 and 32 and is set at a pressure equal to or slightly greater than that to be applied to the oil for expelling the grease beneath the pistons 3, so that any excess pressure will be relieved through the line 32 to the oil reservoir.

The pressure relief valves 20 and 25 are set at the pressures with which the grease and oil respectively are to be delivered to the valve 19. Consequently, the final valve 19 (which governs the operation of the system as will presently appear) does not operate until each of the preceding valves has received the full grease and oil pressures intended for the system.

The motors 13 and 16 are operated at predetermined intervals by means of a clock 36 which closes a switch 37 in the electrical system at such intervals. The grease pump motor 13 alone operates immediately on the closing of the switch 37. Adjacent the final valve 19 are disposed a normally open limit switch 38 and a normally closed limit switch 39. A plunger 40 extends from the piston 3 of the final valve 19 into the space between the switches 38 and 39. The plunger carries at one side a cam 41 adapted to engage and close the normally open switch 38 when raised to its upper limit by the filling of the final valve chamber with grease beneath the piston.

The effect of closing the switch 38 is to break the circuit supplying the motor 13 with current and to close the circuit of the motor 16, whereupon the oil pump functions, fills the chambers 2 above the pistons 3 and discharges the grease to the bearings in the manner already described. When the piston 3 has displaced the grease from the chambers 2, a cam 42 at the opposite side of the plunger 40 opens the normally closed switch 39 as illustrated in the drawing. The effect of opening the switch 39 is to break the circuit to the oil pump, so that both pumps are now idle and the system is inoperative until the grease pump motor circuit is again closed by the time switch 37.

It will be evident from the foregoing that the measuring valves connected to the several bearings are simultaneously operated at predetermined intervals for which the clock 36 is set. An important property of the invention is that the final valve 19, which governs the operation of the grease and oil pumps as described, is not operated until all the preceding valves receive grease and oil at the maximum desired pressures. This condition is brought about by the insertion of the relief valves 20 and 25 immediately in advance of the final valve 19, so that the maximum permissible pressures of grease and oil are assured in the measuring valves 1 before the final valve 19 is actuated. The same pressures are assured in the final valve by reason of the opening of the valves 20 and 25 at these pressures before the valve 19 is filled with either fluid. Consequently, there is no possibility of discharging grease into the bearings at lower pressures than intended.

In the event that either of the lines 17 or 21 becomes obstructed, the development of excessive pressures will be prevented by the relief valves 34 and 35 as already described. The final valve 19 will in such a case fail to operate, and hence the electrical system will not operate. The failure of the electrical system would readily be observed and in fact may be detected by the use of a signal light or a pressure recorder operatively connected to the final valve 19.

The electrical system may be of any suitable character capable of operating the motors 13 and 16 from the plunger 40 in the manner described. The system illustrated herein is merely incidental to the invention and is not intended to limit the invention thereto, inasmuch as numerous electrical systems, operating on direct or alternating current, for accomplishing the described functions may be designed by one skilled in the art. The system shown in the drawing will now be described merely for the purpose of illustration.

*Electrical circuit*

An alternating current circuit represented by the conductors 50 and 51 and controlled by a line switch 52 energizes the primary winding 53 of a transformer associated with the clock 36. The secondary winding 54 of the clock transformer energizes the field 55 and operates the clock which in turn closes the switch 37 at predetermined intervals as already stated.

In the system shown herein, the motors 13 and 16 are direct current shunt motors with starting resistances, although an electrical system in keeping with the invention may readily be designed for alternating current motors if desired. The direct current enters at a line conductor A and passes through the line switch B to a conductor B', continuing from the point C' through conductor 56 and switch 37 when closed, along conductor 57 to a manual switch 58 which must be closed to render the circuit operative, thence along conductor 59 through a grease motor controlling contact C, thence through an overload relay 60 to the solenoid F of a magnetic switch, thence diverging at point E into a conductor 61 to the switch B and other side A' of the line. The flow of current through solenoid F closes a switch F' to which is linked a maintaining switch F². The shunt field of the motor 13 is now comprised in a circuit with the following parts: Line A, switch B, conductor 63 leading to the winding G of the overload relay switch 60 and thence through the switch F' to the grease motor field conductor 64 returning by the common return 65 to a conductor 66 leading to the switch B and line A'. The armature current is taken from the conductor 63 at its point of intersection with the conductor 64, flows through the starting resistance 67 and grease motor armature conductor 68 returning by the common return 65. Where the current passes from resistance 67 to conductor 68, it is branched off to a coil H and then flows through conductors 69 and 70 to point E and thence to line A' through the path already described. Coil H is thus energized and closes a switch H² which cuts out the starting resistance 67, permitting the current to flow from conductor 63 through this switch to conductor 68.

The grease motor circuit as thus described depends on the closing of the clock switch 37, which however is closed only for an instant. An auxiliary circuit passes through the switch F² and maintains the motor in operation independently of the switch 37. This circuit comprises the following parts: Line A, switch B, coil G, switches F' and F², conductor 71, switch 58, conductor 59, switch C, relay 60, coil F, point E, conductor 61, switch B and line A'.

When the measuring valves have been filled with grease, the pistons 3 thereof are raised to the uppermost limit. The raised position of the piston in the final valve 19 causes the cam 41 to close the normally open limit switch 38. A circuit through this switch comprises the following parts: Line A, switch B, conductor B' to point C', conductor 72 through the limit switch, through a common return 73, through an overload relay switch P for the oil motor circuit, solenoid L, point E, conductor 61, switch B and line A'. The passage of current through solenoid L closes switches L' and L² and opens the grease motor maintaining contact C, whereupon the grease motor circuit is broken and the grease motor stopped. An oil motor circuit is now established through the following: Line A, switch B, conductor 63, conductor 74, winding P' of the overload relay P, switch L', conductor 75, conductor 76 to the oil motor field, returning by the common return 77 to conductor 66, switch B and line A'. From conductor 75, the current also flows through a starting resistance 78 for the oil pump motor, passing through conductor 79 to the oil motor armature and returning by the common return 77. Proceeding from the starting resistance 78, the current also flows through coil R and conductor 70 to switch B and line A', thereby closing the switch R' and short circuiting the starting resistance 78.

The oil motor is now running and causing the oil pump 15 to move the pistons 3 towards their respective outlets 7, whereby the grease above the partitions 4 is injected to the bearings at the pressure determined by the relief valve 25. Before the piston 3 of the final valve 19 has completed its stroke, the cam 41 retracts from the switch 38 and permits the latter to assume its normal open position. The opening of this switch would de-energize the coil L and open the switch L' comprised in the oil motor circuit, so that the latter circuit would be broken. But before the switch 38 opens, a simultaneous circuit through the coil L is maintained through the following parts: Line A, switch B, conductors 63 and 74, coil P', switches L' and L², conductor 80 to the switch 39, returning by the common return 73, overload relay switch P, coil L, point E, conductor 61, switch B and line A'. The latter circuit maintains the coil L energized and the switches L' and L² closed after the switch 38 opens by the initial retracting movement of the cam 41 by the movement of the piston 3 under pressure from the oil pump. The auxiliary or maintaining circuit for the oil pump motor, however, is dependent on the switch 39. When the final valve 19 is fully discharged, the cam 42 opens the normally closed limit switch 39 and breaks the oil motor circuit. The system is now idle until the switch 37 is again closed by the clock, whereupon another cycle such as that described takes place.

Although the invention is herein described in connection with a lubricating system, it is also applicable for a similar distribution of measured quantities of any other fluid. Such other uses are contemplated within the scope of the annexed claims which refer to a lubricating system merely by way of example.

Although a specific embodiment of the invention has been illustrated and described, it will be understood that various alterations in the details of construction may be made without departing from the scope of the invention, as indicated by the appended claims.

What we claim is:—

1. An automatic lubricating system comprising a series of measuring valves, a feed line common thereto, a pressure actuated piston in each valve, a pump for charging said line, a motor for driving said pump, and means connected directly to the piston in the final valve of the series for controlling the supply of current to said motor.

2. An automatic lubricating system comprising a series of measuring valves, a feed line common thereto, a pump for charging said line, a motor for driving said pump, and a pressure relief valve interposed in said line directly in advance of the final valve in the series, whereby said final valve is operative only on the attainment of a predetermined pressure in the relief valve and the preceding measuring valves.

3. An automatic lubricating system comprising a series of measuring valves, a feed line common thereto, a pump for charging said line, a motor for driving said pump, a pressure relief valve interposed in said line directly in advance of the final valve in the series, whereby said final valve is operative only on the attainment of a predetermined pressure in the relief valve and the preceding measuring valves, and pressure actuated means responsive to pressure in the final valve of the series for controlling the supply of energy to said motor.

4. An automatic lubricating system comprising a series of measuring valves, a feed line common thereto, a pressure actuated piston in each valve, a pump for charging said line, a motor for driving said pump, means connected directly to the piston in the final valve of the series for controlling the supply of current to said motor, and a timed switch in the circuit of said motor.

5. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumps for charging said lines, motors for operating said pumps, and pressure actuated means responsive to fluid pressure in the feed lines for successively controlling the circuits of said motors.

6. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, means for charging said lines, and pressure relief valves interposed in said lines directly in advance of the inlets of the final valve in the series, whereby said final valve is operative only on the attainment of predetermined pressures in the relief valves and the preceding measuring valves.

7. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumping means for charging said lines, driving means for operating said pumping means, pressure relief valves interposed in said lines, and pressure actuated means behind said relief valves and responsive to fluid pressure in said lines for controlling said driving means.

8. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumping means for charging said lines, driving means for operating said pumping means, pressure actuated means responsive to fluid pressure in said lines for controlling said driving means, and a timed switch in the circuit of said driving means.

9. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumps for charging said lines, motors for operating said pumps, a pressure actuated member responsive to fluid pressure in said lines, and means carried by said member for stopping the lubricant pump motor and starting the other motor when said member is actuated.

10. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumps for charging said lines, motors for operating said pumps, a pressure actuated member responsive to fluid pressure in one of the valves in the series, means carried by said member for stopping the lubricant pump motor and starting the other motor when said valve is filled with lubricant and for stopping said other motor when said valve is filled with the pressure fluid medium.

11. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumps for charging said lines, motors for operating said pumps, a pressure actuated member responsive to fluid pressure in said lines, means carried by said member for stopping the lubricant pump motor and starting the other motor when said member is actuated, and a timed switch in the circuits of said motors.

12. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumps for charging said lines, motors for operating said pumps, a pressure actuated member responsive to fluid pressure in one of the valves in the series, means carried by said member for stopping the lubricant pump motor and starting the other motor when said valve is filled with lubricant and for stopping said other motor when said valve is filled with the pressure fluid medium, and a timed switch in the circuits of said motors.

13. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, means for charging said lines, and a pressure relief valve interposed in said pressure line directly in advance of the final valve in the series, whereby said final valve is operative only on attainment of a predetermined discharging pressure in the preceding measuring valves.

14. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumping means for charging said lines, driving means for operating said pumping means, a pressure relief valve interposed in said pressure line, and pressure actuated means behind said relief valve and responsive to fluid pressure in the final valve in said lines for controlling said driving means.

15. An automatic lubricating system comprising a series of measuring valves, a feed line common thereto, a pressure actuated piston in each valve, a pump for charging said line, a motor for driving said pump, and means connected directly to one of said pistons for controlling the supply of current to said motor.

16. An automatic lubricating system comprising a series of measuring valves, a feed line common thereto, a pump for charging said line, a motor for driving said pump, a pressure relief valve interposed in said line directly in advance of a valve in the series, whereby said valve is operative only on the attainment of a predetermined pressure in the relief valve, and pressure actuated means responsive to pressure in said valve in the series for controlling the supply of energy to said motor.

17. An automatic lubricating system comprising a series of measuring valves, a feed line common thereto, a pressure actuated piston in each valve, a pump for charging said line, a motor for driving said pump, means connected directly to one of said pistons for controlling the supply of current to said motor, and a timed switch in the circuit of said motor.

18. An automatic lubricating system comprising a series of measuring valves of the type wherein lubricant is introduced under pressure and discharged under pressure by a fluid medium, each of said valves having an inlet for lubricant, an inlet for the pressure fluid medium, and an outlet adapted for connection to a bearing; a lubricant line connected to the lubricant inlets of said valves, a pressure line connected to the pressure fluid inlets of said valves, pumping means for charging said lines, and actuated means responsive to fluid pressure in the feed lines for controlling said pumping means.

19. An automatic lubricating system comprising a series of discharge members, a feed line common thereto, a pressure actuated piston in each member, means for charging said line and members, and means connected directly to one of said pistons for controlling the operation of said charging means.

20. An automatic lubricating system comprising a series of discharge members, a feed line common thereto, means for charging said line and members, means responsive to pressure in said line for controlling the operation of said charging means, and a pressure regulator disposed in said line in advance of said pressure responsive means, whereby said pressure responsive means is operative only on attainment of a predetermined pressure in said line.

21. An automatic lubricating system comprising a series of discharge members, a pair of feed lines connected to each of said members and operable respectively for charging and discharging said members, means for supplying said lines and members with fluid, directing means interposed between said supply means and said lines for alternately directing fluid first to one of said lines and then to the other, and means responsive to pressure in said lines for actuating said directing means.

22. An automatic lubricating system comprising a series of discharge members, a pair of feed lines connected to each of said members and operable respectively for charging and discharging said members, means for supplying said lines and members with fluid, directing means interposed between said supply means and said lines for alternately directing fluid first to one of said lines and then to the other, means responsive to pressure in said lines for actuating said directing means, and pressure regulators interposed in said lines in advance of said pressure responsive means, whereby said pressure responsive means is operative only on attainment of a predetermined pressure in said lines.

WILLIAM K. HAWKS.
AARON J. JENNINGS.